United States Patent
Dürr et al.

(10) Patent No.: US 11,184,444 B1
(45) Date of Patent: Nov. 23, 2021

(54) NETWORK TRAFFIC REDUCTION BY SERVER-CONTROLLED COOKIE SELECTION

(71) Applicant: International Business Machines Corporation, Armonk, NY (US)

(72) Inventors: Thomas Dürr, Magstadt (DE); Martin Smolny, Boeblingen (DE); Georg Ochs, Moetzingen (DE); Gregor Möhler, Stuttgart (DE); Klaus Rindtorff, Weil im Schönbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/939,587

(22) Filed: Jul. 27, 2020

(51) Int. Cl.
| | |
|---|---|
| *H04L 29/08* | (2006.01) |
| *G06F 16/28* | (2019.01) |
| *G06F 16/957* | (2019.01) |
| *G06F 16/955* | (2019.01) |
| *H04L 12/24* | (2006.01) |

(52) U.S. Cl.
CPC .......... *H04L 67/146* (2013.01); *G06F 16/285* (2019.01); *G06F 16/955* (2019.01); *G06F 16/9574* (2019.01); *H04L 41/50* (2013.01); *H04L 67/02* (2013.01); *H04L 67/10* (2013.01); *H04L 67/14* (2013.01)

(58) Field of Classification Search
None
See application file for complete search history.

(56) References Cited

U.S. PATENT DOCUMENTS

| | | | | |
|---|---|---|---|---|
| 6,138,142 A | * | 10/2000 | Linsk | G06F 16/9535 709/203 |
| 6,374,359 B1 | * | 4/2002 | Shrader | H04L 29/06 709/229 |
| 6,393,479 B1 | * | 5/2002 | Glommen | G06F 11/3495 709/219 |
| 6,848,000 B1 | * | 1/2005 | Reynolds | H04L 29/06 709/203 |

(Continued)

FOREIGN PATENT DOCUMENTS

KR 101608025 B1 3/2016

OTHER PUBLICATIONS

Rabinovich, "Secure cross-domain cookies for HTTP", Journal of Internet Services and Applications 2013, 4:13, 12 pages. https://jisajournal.springeropen.com/articles/10.1186/1869-0238-4-13.

*Primary Examiner* — Lashonda T Jacobs
(74) *Attorney, Agent, or Firm* — Timothy J. Singleton

(57) ABSTRACT

A computer-implemented method for reducing cookie traffic in browser communication is provided. The method sends, by a browser to a domain, a first request resulting in a returned cookie. The returned cookie includes a category tag. The method adds the returned cookie to a set of cookies for the browser. The category tag of the returned cookie is added to a related category tag in a browser tag list. The method sends, by the browser to a server of the domain, a second request resulting in a returned list of required category tags. The method sends a selected cookie with a category tag relating to at least one required category tag of the list of required category tags for the server. The selected cookie is selected from the set of cookies and the category tag for the selected cookie occurs within the browser tag list.

20 Claims, 6 Drawing Sheets

(56) References Cited

U.S. PATENT DOCUMENTS

| | | | |
|---|---|---|---|
| 7,185,364 B2* | 2/2007 | Knouse | H04L 63/0815 726/8 |
| 7,302,402 B2* | 11/2007 | Callaghan | G06Q 30/02 705/26.8 |
| 7,359,958 B2* | 4/2008 | Sears, Jr. | G06F 16/9535 709/219 |
| 7,552,210 B1* | 6/2009 | Blum | H04L 67/02 709/202 |
| 7,925,694 B2* | 4/2011 | Harris | H04L 67/2842 709/203 |
| 8,019,881 B2* | 9/2011 | Sandhu | H04L 63/168 709/229 |
| 8,041,778 B2* | 10/2011 | Krabach | H04L 67/02 709/218 |
| 8,166,406 B1* | 4/2012 | Goldfeder | H04L 63/102 715/745 |
| 8,200,833 B1* | 6/2012 | Lau | H04L 63/168 709/228 |
| 8,214,486 B2* | 7/2012 | Britton | G06Q 30/02 709/224 |
| 8,214,510 B2* | 7/2012 | Dutta | G06F 16/957 709/228 |
| 8,566,452 B1 | 10/2013 | Goodwin, III et al. | |
| 8,578,036 B1* | 11/2013 | Holfelder | G06F 16/951 709/228 |
| 8,676,955 B1 | 3/2014 | Masters et al. | |
| 8,874,695 B2* | 10/2014 | Zhang | H04L 67/42 709/219 |
| 8,880,710 B2* | 11/2014 | Goldspink | G06F 16/958 709/228 |
| 8,898,309 B2* | 11/2014 | Goldspink | H04L 67/14 709/227 |
| 9,104,778 B2* | 8/2015 | Casteel | G06Q 30/0255 |
| 9,230,036 B2* | 1/2016 | Davis | G06F 16/957 |
| 9,390,193 B2* | 7/2016 | Nepper | G06F 16/9574 |
| 9,613,156 B2* | 4/2017 | Zhao | H04L 67/02 |
| 10,027,773 B2* | 7/2018 | Seth | H04L 67/2814 |
| 10,318,988 B2* | 6/2019 | Bodz | H04L 67/22 |
| 2001/0023442 A1* | 9/2001 | Masters | H04L 67/1017 709/227 |
| 2002/0156781 A1* | 10/2002 | Cordray | G06F 16/95 |
| 2004/0049673 A1* | 3/2004 | Song | G06F 16/958 713/150 |
| 2005/0021731 A1* | 1/2005 | Sehm | H04L 67/22 709/224 |
| 2005/0044176 A1* | 2/2005 | Sears, Jr. | G06F 16/9535 709/217 |
| 2005/0216845 A1* | 9/2005 | Wiener | G06F 16/951 715/745 |
| 2006/0036875 A1* | 2/2006 | Karoubi | H04L 9/00 713/191 |
| 2006/0075122 A1* | 4/2006 | Lindskog | H04L 63/168 709/228 |
| 2006/0174327 A1* | 8/2006 | Song | G06F 21/6209 726/3 |
| 2007/0078333 A1* | 4/2007 | Abe | G01R 33/5601 600/420 |
| 2009/0083421 A1* | 3/2009 | Glommen | G06Q 30/02 709/224 |
| 2010/0094704 A1* | 4/2010 | Subramanian | G06Q 30/0242 705/14.45 |
| 2011/0078333 A1* | 3/2011 | Jakubowski | H04L 67/1095 709/248 |
| 2011/0208840 A1* | 8/2011 | Blackman | G06F 16/9577 709/220 |
| 2011/0314114 A1* | 12/2011 | Young, III | G06Q 30/02 709/206 |
| 2012/0233351 A1* | 9/2012 | Gorgens | H04L 61/1511 709/245 |
| 2014/0019518 A1* | 1/2014 | Nepper | G06F 16/9574 709/203 |
| 2014/0164447 A1* | 6/2014 | Tarafdar | G06F 16/182 707/827 |
| 2019/0130134 A1* | 5/2019 | Sanchez | H04L 63/0407 |

* cited by examiner

NETWORK TRAFFIC REDUCTION BY SERVER-CONTROLLED COOKIE SELECTION

BACKGROUND

Cookies in a browser service communication are a well-known technique for making the generally stateless protocol used on the World Wide Web (e.g., HTTP) stateful. Many browsers may store a large number of cookies if the cookies are not deleted from time to time. Most users do not do this electronic hygiene task. Many do not do it because they simply do not know. Consequently, the list of stored cookies in a browser grows over the lifetime of the browser, i.e., the computer system. In many cases, hundreds and thousands of cookies may be stored by the web browser.

Additionally, in larger cloud computing installations in which a plurality of servers collaborate to deliver a joint service composed out of micro-services, each server involved may track his own activities in respect to the browser by placing its own cookies.

On the other side, browser sends during an initialization of the session—i.e., a first request to a server after a long time or after a restart of the browser—generally all cookies to all servers that are addressed. Thus, the small pieces of data—i.e., the cookies—managed by the Web server introduce a large communication overhead on the underlying network. This is the standard for HTTP cookies according to RFC 2109. It basically defines the cookie from art and the rules for proper handling of cookies by web browsers, servers, and proxies. Additionally, cookies may be subdivided into session cookies which may be erased when the browser is closed, and persistent cookies, which are preserved across multiple browser sessions.

SUMMARY

According to one aspect of the present invention, a computer-implemented method for reducing cookie traffic in browser communication is provided. The method sends, by a browser to a domain, a first request resulting in a returned cookie. The returned cookie includes a category tag. The method adds the returned cookie to a set of cookies for the browser. The category tag of the returned cookie is added to a related category tag in a browser tag list. The method sends, by the browser to a server of the domain, a second request resulting in a returned list of required category tags. The method sends a selected cookie with a category tag relating to at least one required category tag of the list of required category tags for the server. The selected cookie is selected from the set of cookies and the category tag for the selected cookie occurs within the browser tag list.

According to another aspect of the present invention, a cookie management system for reducing cookie traffic in browser communication may be provided. The cookie management system may comprise one or more processors, and a computer-readable storage medium. The computer-readable storage medium may be coupled to the one or more processors and store program instructions that cause the one or more processors to perform operations including sending, by a browser to a domain, a first request resulting in a returned cookie, wherein the returned cookie includes a category tag. The operations add the returned cookie to a set of cookies for the browser and the category tag of the returned cookie to a related category tag in a browser tag list. The operations send a second request resulting in a returned list of required category tags. The operations send a selected cookie with a category tag relating to at least one required category tag of the list of required category tags for the server. The selected cookie is selected from the set of cookies. The category tag of the selected cookie occurs within the browser tag list.

Furthermore, embodiments may take the form of a related computer program product, accessible from a computer-usable or computer-readable medium providing program code for use, by, or in connection with, a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

Figure 1:
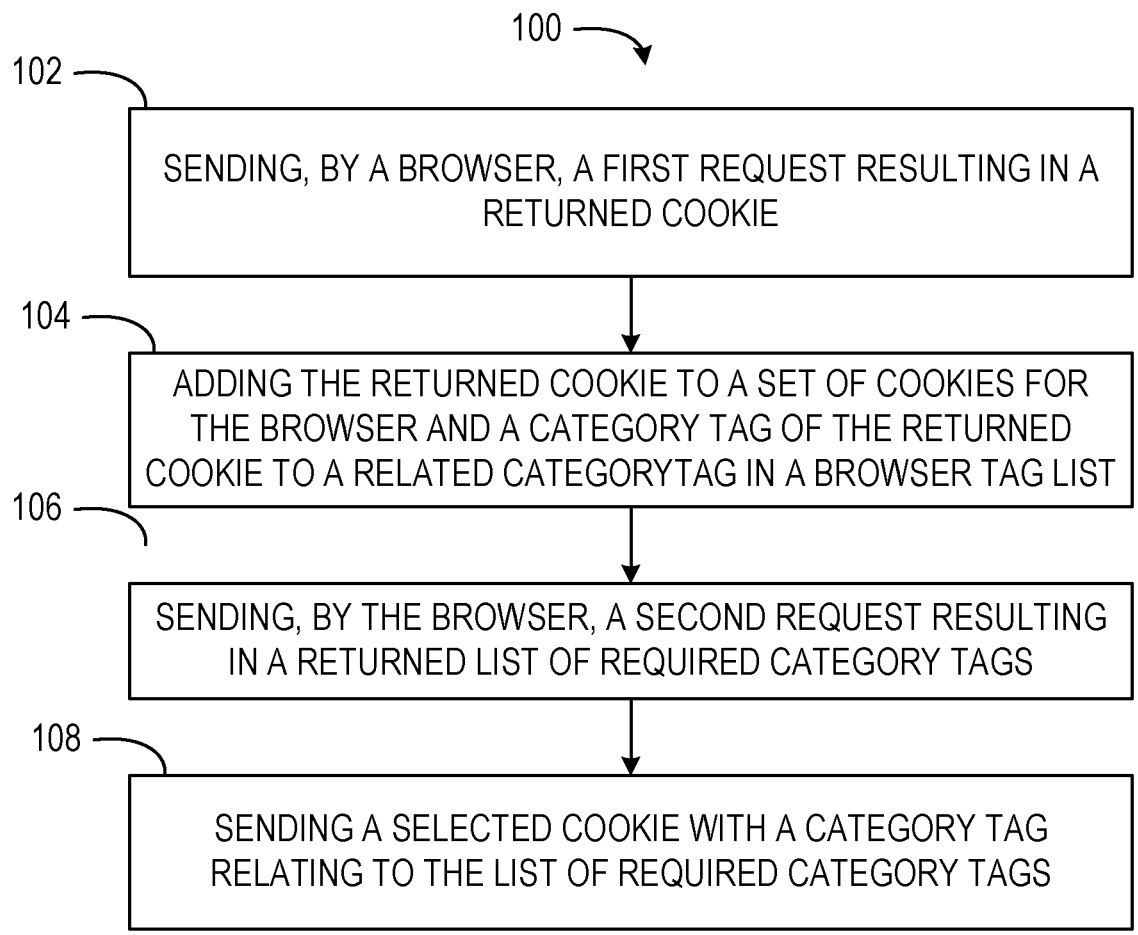
FIG. 1 shows a block diagram of a computer-implemented method for reducing cookie traffic in browser communication, according to at least one embodiment.

The present disclosure relates generally to cookie management for web browsers. More particularly, but not exclusively, embodiments of the present disclosure present a computer-implemented method for reducing cookie traffic in browser communication. The present disclosure relates further to a related cookie management system for reducing cookie traffic in browser communication, and a computer program product.

In the context of this description, the following conventions, terms and/or expressions may be used:

The term 'cookie'—in particular, an HTTP cookie, web cookie, Internet cookie, browser cookie—may denote a small piece of data sent from a website, i.e., a server, and stored on a user's computer by the user's web browser while the user is browsing. The same concept may be used for other web clients. The cookies are useful as a reliable mechanism to allow stateful (remembering a status of a communication) communication between a web client and a browser that would otherwise be stateless. Especially, in e-commerce frameworks it may be useful to manage consistent information between a web client and a browser for electronic shopping carts in online stores and/or to record a user's browsing activity and/or login information.

The term 'browser'—in particular a web browser—may denote the known software application comprising a user interface for accessing information on the World Wide Web. Typically, when a user may request a particular website by clicking on a hyperlink on a web page, the web browser requests and retrieves the necessary content from a web server and then displays the resulting webpage on the user's device. It may be noted that instead of a browser, the proposed concept may also work for other (user interface free) web clients.

The term 'first request' may denote a first call of a session between a browser and a server initiating a potentially longer communication session.

The term 'category tag' may denote a core element of the here proposed concept. Via the category tag it may be determined which server may require which cookie. Cookies may be related to a specific category. Hence, only those tags may be sent from the browser to a server whose category tag has been specified by the server as required.

The term 'browser tag list' may denote a mapping of specific servers to one or more category tags. The browser tag list may be managed as part of the browser application and may be stored persistently so that the browser tag list may also be available after a restart of the browser application. Instead of the browser, the same concept may be applied by web clients.

The term 'server-to-cookie mapping' may describe a consequence of the browser tag list. This mapping may be used as a lookup table for required tags for specific servers.

The term 'HTTP' may denote the known hypertext transfer protocol (also available in the form of HTTPS/HTTPsecure). It is an application protocol for distributed, collaborative, hypermedia information systems. It is the foundation of data communication for the World Wide Web where hypertext documents include hyperlinks to other resources. The protocol is principally stateless.

The computer-implemented method for reducing cookie traffic in browser communication—as well as the related system—may offer multiple advantages, contributions and technical effects:

The here proposed concept may help to reduce communication traffic from a browser to a specific server. It may overcome the communication burden between a browser and any server according to which a browser sends all cookies available in the browsers storage when a new communication session to a new server is started. The reason is simple: No information is available for the browsers about what type of cookies may be required for a particular server.

The here proposed concept overcomes this communication overhead, and may only send required cookies selectively to specific servers. The information about the required cookies may come from the server directly, e.g., by a so-called OPTIONS called. However, the information may also be provided to the browser (or a web client) by, e.g., an authentication server, which may typically be contacted at the beginning of the session.

The browser may build a server/required cookie mapping and may use it as a lookup instrument for all further communication contacts between the browser and the specific server. It may also be noted that the proposed concept may work for session cookies as well as persistent cookies.

In the following, additional embodiments—applicable for the method and related cookie management system—will be described:

According to a useful embodiment, the method may also comprise sending, by the browser, a third request comprising only the cookies required according to the browser tag list. In contrast to the first and the second request, the third request may be addressed to another, i.e., a second server.

Instead of sending the complete plurality of cookies available on the browser side to the second server, the browser may only send those cookies to the second server that are required by the second server. Thus, the communication overhead may be reduced.

According to a preferred embodiment of the method, the required cookie is a list of required cookies. In a special case, the list may have a length of 1. This may build the base case for the proposed concept. However, typically more than one cookie is stored on the browser side. Hence, the proposed concept will also work in a multi-cookie browser environment.

According to an additionally advantageous embodiment, the method may also comprise building a server-to-cookie mapping by the browser. Hence, whenever a communication between the browser and any of a plurality of servers being addressed by the browser may be initiated, the browser system may access the server-to-cookie map in a lookup-manner in order to limit the sent cookies to those that are required by the addressed server.

According to one optional embodiment of the method, a tag may comprise a wildcard as a component of a category tag. This may allow a hierarchy of category tags for cookies and may, thus, reduce the required storage space for the map of required cookie tags. It may also help to increase the communication speed between the browser and a specific server.

According to one permissive embodiment of the method, the first, the second request or the third request may be a hypertext transfer protocol request, such as an HTTP (hypertext transfer protocol) or an HTTPS (hypertext transfer protocol secure) request. Hence, typical Internet protocols may be used as the basis for the here proposed concept. However, the proposed concept is not limited to the just mentioned protocol types. Also other protocols may be used in combination with the proposed concept to reduce cookie traffic.

According to a further embodiment of the method, the browser tag list may be stored persistently. Consequently, the required cookie tags for specific servers may also continue to exist after a shutdown of the computing system underlying the browser. Therefore, building the method of required cookie tags for a plurality of servers can be avoided after a restart of the browser. Also this may help to reduce cookie-initiated communication traffic to and from a browser.

According to an enhanced embodiment of the method, the browser may be a component of an application, in particular an application form of a web client. As a consequence, the proposed concept may not only work using a browser but may be expanded to HTTP, HTTPS application interface calls to a plurality of different servers. This concept may, in particular, be useful in Cloud computing environments using a plurality of servers, dedicated services or micro-services.

According to a further useful embodiment of the method, the category tag may be a component of hypertext transfer protocol header data, such as HTTP header data or HTTPS header data. Consequently, no additional and complex protocol changes would be required. Locations in the existing protocols typically used for cookie related data may also be used for the additional data required by the here proposed method and system.

According to one optional embodiment of the method, the result of the second request may also be a list of cookies not to be sent, in particular, to a specific server. Using this technique, not only a white-listing can be enabled but also a black-listing for selected required cookie tags for specific servers. This may reduce the cookie management specific tasks on the browser side even further.

In the following, a detailed description of the figures will be given. All instructions in the figures are schematic. Firstly, a block diagram of an embodiment of the inventive computer-implemented method for reducing cookie traffic in browser communication is given. Afterwards, further embodiments, as well as embodiments of the cookie management system for reducing cookie traffic in browser communication, will be described.

FIG. 1 shows a block diagram of a preferred embodiment of the computer-implemented method 100 for reducing cookie traffic in browser communication—i.e., with a plurality of servers. In operation 102, the method sends, by a browser, a first request. The first request may be sent to a domain or a server or network resource within a domain In some embodiments, the first request is sent relative to a specified application. The application may be run by the browser, accessed by the browser, or run on a server or network resource to supply information relative to the request of the browser. In some embodiments, the request is sent to a server at the beginning of a session. The request results in a returned cookie. In some instances, the returned cookie is at least one cookie or a set of cookies. The returned cookie may relate to the domain, a server of the domain, a network resource of the domain, an application, combinations thereof, or any other specified device or program associated with or accessible from the domain. The return cookie comprises or includes a category tag. In case of more cookies sent from the server to the browser, a plurality of category tags may be transmitted back to the browser. Each category tag may be associated with at least one cookie of a set of returned cookies.

In operation 104, the method adds the returned cookie to its related category tag in a browser tag list. Such a list comprises the tag category and a list of cookies. In some embodiments, the returned cookie or set of returned cookies are added to a set of cookies for the browser. The category tag for the cookie or set of category tags for the set of cookies may be added to the browser tag list. In some embodiments, the category tag or set of category tags of one or more returned cookies is added to the browser tag list in a manner which associates the category tag or set of category tags with related category tags preexisting within the browser tag list.

In operation 106, the method 100 sends, by the browser, a second request. The second request may be sent to a server within the domain. This second request may be directed to a second server. In such instances, the second server may be a different server or network resource than received the first request in operation 102. The first server and the second server may still be part of the same domain. The request may result in a returned list. In some embodiments, the returned list is a single category tag. In some embodiments, the returned list is a set of category tags or a plurality of category tags. The category tag or category tags of the returned list may be required category tags for the resource (e.g., the second server) receiving the second request. An exemplary name for such a call may be "options call".

In operation 108, the method sends a selected cookie with a category tag relating to the required category tag. The selected cookie may be sent to the second server. The category tag of the selected cookie may be related to at least one required category tag of the list of required category tags, where the list includes a set or plurality of category tags. The selected cookie may be selected from a set of cookies available to the browser. The category tag of the selected cookie may occur within the browser tag list. In some embodiments, the method sends only the/those cookie(s) to a selected server (e.g., the second server) relating to the cookie tag which relates back to the specified server (e.g., the second server). Thus, the communication overhead between a browser and a plurality of servers may be reduced to only those cookies, e.g., required by a specific server.

Figure 2:
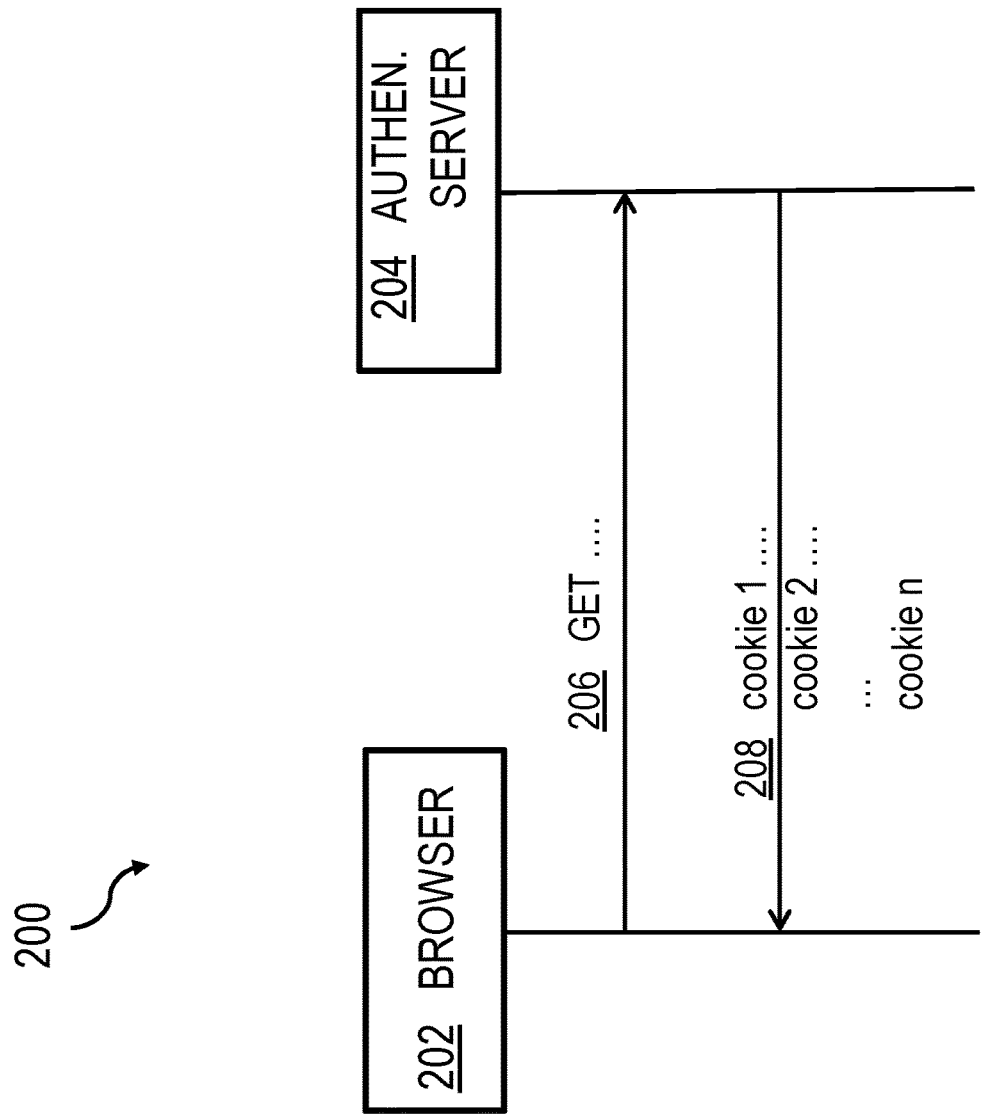
FIG. 2 shows a block diagram of an exemplary communication diagram between a browser and an authentication server, according to at least one embodiment.

FIG. 2 shows a block diagram of an exemplary communication diagram 200 between a browser 202 and the authentication server 204. Firstly, the browser may send, 206, an authentication request, e.g., in the form of "GET /authenticate_user?username=alpha123&password=****", to the authentication server 204. Thereby, "alpha123" may be the username; the four stars may denote the not-shown password in clear text. As a result of this request from the browser 202 to the authentication server 204, the authentication server 204 may return, 208, two cookies; namely:

cookie 1: name=username; value=alpha123; tags= user, . . . .
cookie 2: name=last_login; value=2020-01-30; tags=statistics, . . . .

This may result in the tag-to-cookie mapping in the browser, namely:

| user | username |
| statistics | last_login |

The two cookies discussed above are examples, and more or fewer cookies of similar or dissimilar types can be returned, 208 in other embodiments of the present disclosure. In order to build a more comprehensive map of required cookie checks, one may refer to FIG. 3.

Figure 3:
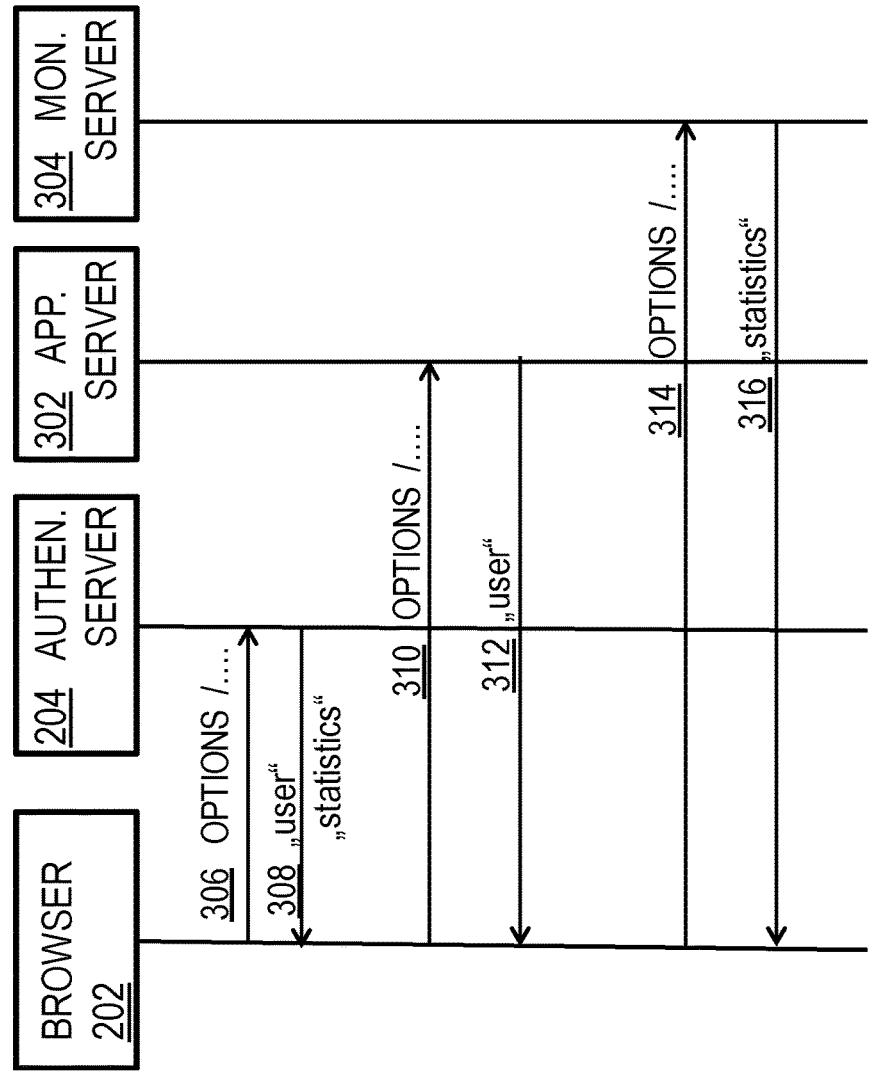
FIG. 3 shows a block diagram of an exemplary communication diagram between a plurality of communication paths for building a map of required cookie tags, according to at least one embodiment.

FIG. 3 shows a block diagram of an exemplary communication diagram 300 for a plurality of communication paths for building a map of required cookie tags. Three communication paths are shown in FIG. 3: from the browser 202 to the authentication server 204, from the browser 202 to the application server 302 and, from the browser 202 to the monitoring server 304.

Firstly, the browser initiates an OPTIONS call 306 from the browser to the authentication server in the form of, e.g., "OPTIONS /required_cookie_tags". The authentication server 204 may respond with the message 308 required cookies are "user", "statistics".

Secondly, the browser initiates an option called 310 to the application server 302 in the form of, e.g., "OPTIONS /required_cookie_tags". The authentication server 302 may respond with the message 312 required cookies are "user".

Thirdly, the browser initiates an option called 314 to the monitoring server 302 in the form of, e.g., "OPTIONS /required_cookie_tags". The monitoring server 304 may respond with the message 316 required cookies are "statistics".

Hence, the browser may build a map as a server-to-cookie mapping in the browser according to:

| authentication server | user, statistics |
| application server | user |
| monitoring server | statistics |

Based on this mapping, the browser will only send those cookies back to the server. Communication dialogue may accompany the cookies, in instances where the communication dialogue and cookie are to be sent to the same specific servers. Again, this reduces the communication traffic due to cookies because only those cookies are sent to a server that are required by the selected server.

Figure 4:
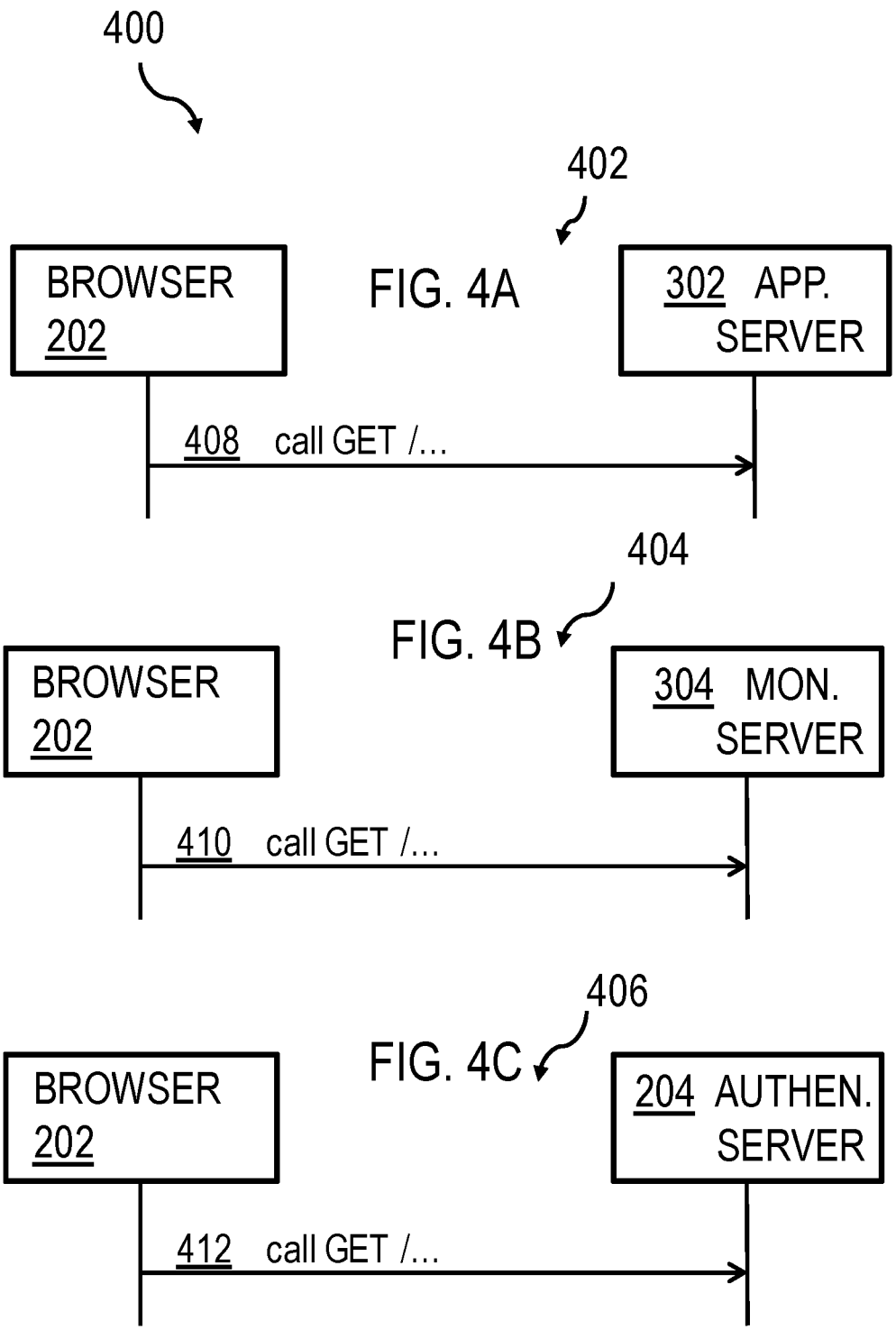
FIGS. 4A, 4B, 4C show exemplary communication diagrams between the browser, an application server, a monitoring server, and an authentication server, according to at least one embodiment.

In order to illustrate (400) further, FIGS. 4A, 4B, 4C show exemplary communication diagrams 402, 404 and 406 between the browser, an application server, a monitoring server and an authentication server. FIG. 4A shows a call 408 from the browser 202 to the application server 302 in the form of, e.g., call GET /do_something_with_cookie "username= alpha123".

It may be noted that the cookie "username" is tagged with cookie tag "user". From the above mapping it is known that the application server 302 requires the tag "user".

Similarly, FIG. 4B shows a call 410 from the browser 202 to the monitoring server 304 in the form of, e.g., call GET /do_something_with_cookie "last_login=2020-01-30".

Here, it may be noted that the cookie "last_login" is tagged with "statistics". From the above mapping it is known that the monitoring server 304 requires the tag "statistics".

Again similarly, FIG. 4C shows a call 412 from the browser 202 to the authentication server 204 in the form of, e.g., call GET /do_something_with_cookie "username" and "last_login".

Here, it may be noted that the cookie "username" is tagged with "user" and the cookie "last_login" is tagged with "statistics". From the above mapping it is known that the authentication server 204 requires the tag "user" and "statistics".

Thus, also from these examples it should be evident that a clear cookie-to-server mapping reduces the cookie traffic between a browser and a plurality of servers significantly.

Figure 5:
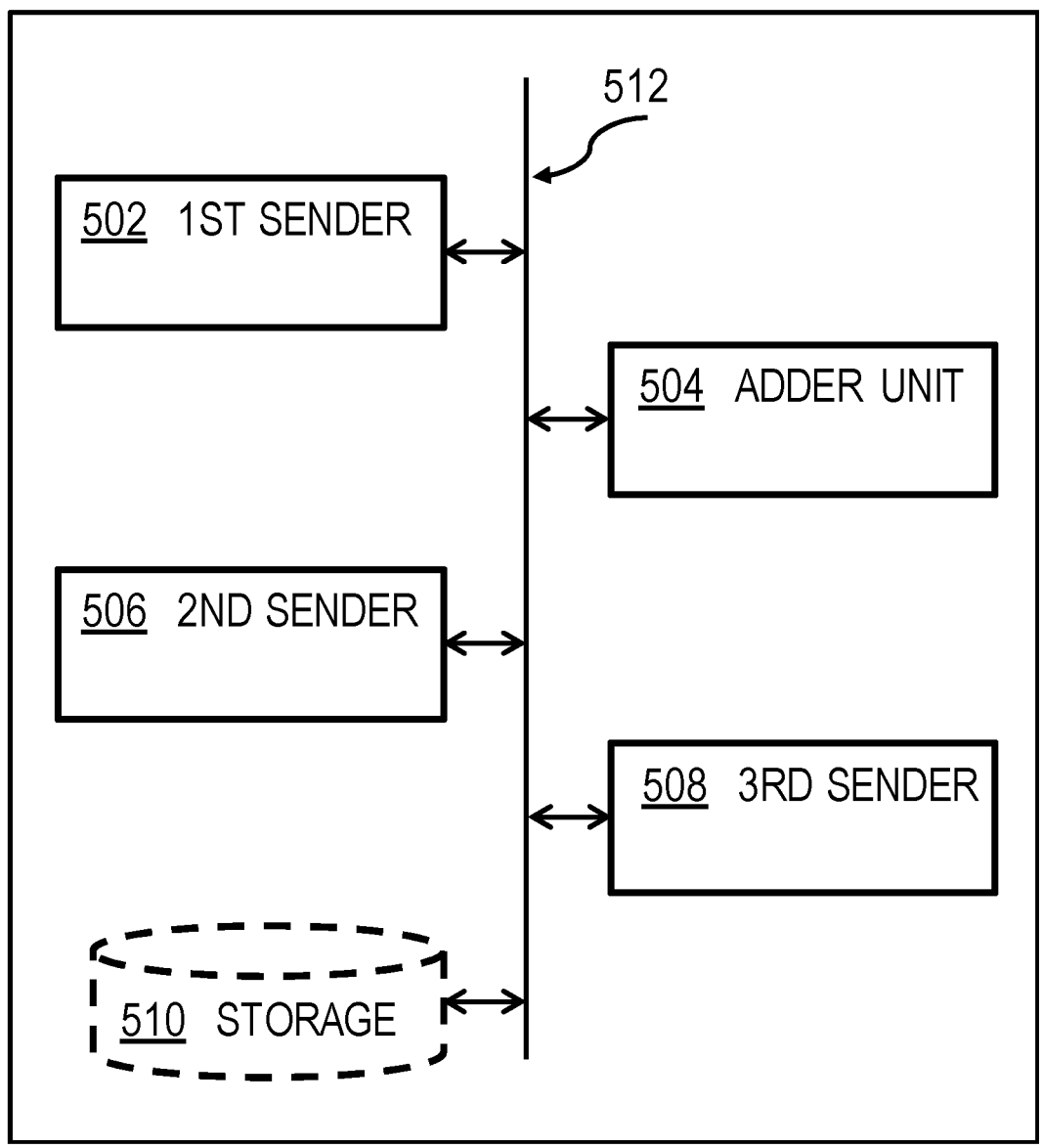
FIG. 5 shows a block diagram of an embodiment of the cookie management system, in accordance with an embodiment of the present disclosure.

FIG. 5 shows a block diagram of an embodiment of the cookie management system 500. The cookie management system 500 comprises first sending means—in particular a first sender 502—adapted for sending, by the browser, a first request resulting in a returned cookie. Thereby, the cookie comprises a category tag.

The cookie management system 500 comprises also adding means—in particular an adding unit 504—adapted for adding the returned cookie to its related category tag in a browser tag list, second sending means—in particular, the second sender 506—adapted for sending, by the browser, a second request resulting in a returned list of required category tags, and third sending means—in particular the third sender 508 adapted for sending only the cookie with the cookie tag relating to the indicated server. Optionally, the cookie management system may also comprise storage 510 for persistently storing the mapping of the required tags.

It may be noted that on modules and/or units of the cookie management systems—in particular the first sender 502, the adder unit 504, the second sender 506, and the third sender 508 and the storage 510 may be connected selectively by wires for signal exchanges and/or they may be connected to a cookie management system internal bus system 512. Also the browser itself may be built as a hardware unit which may also be connected to the bus system 512. It may also be mentioned, that the first sender 502, the second sender 506 and the third sender 508 may actually be the same unit adapted for sending three different messages.

Figure 6:
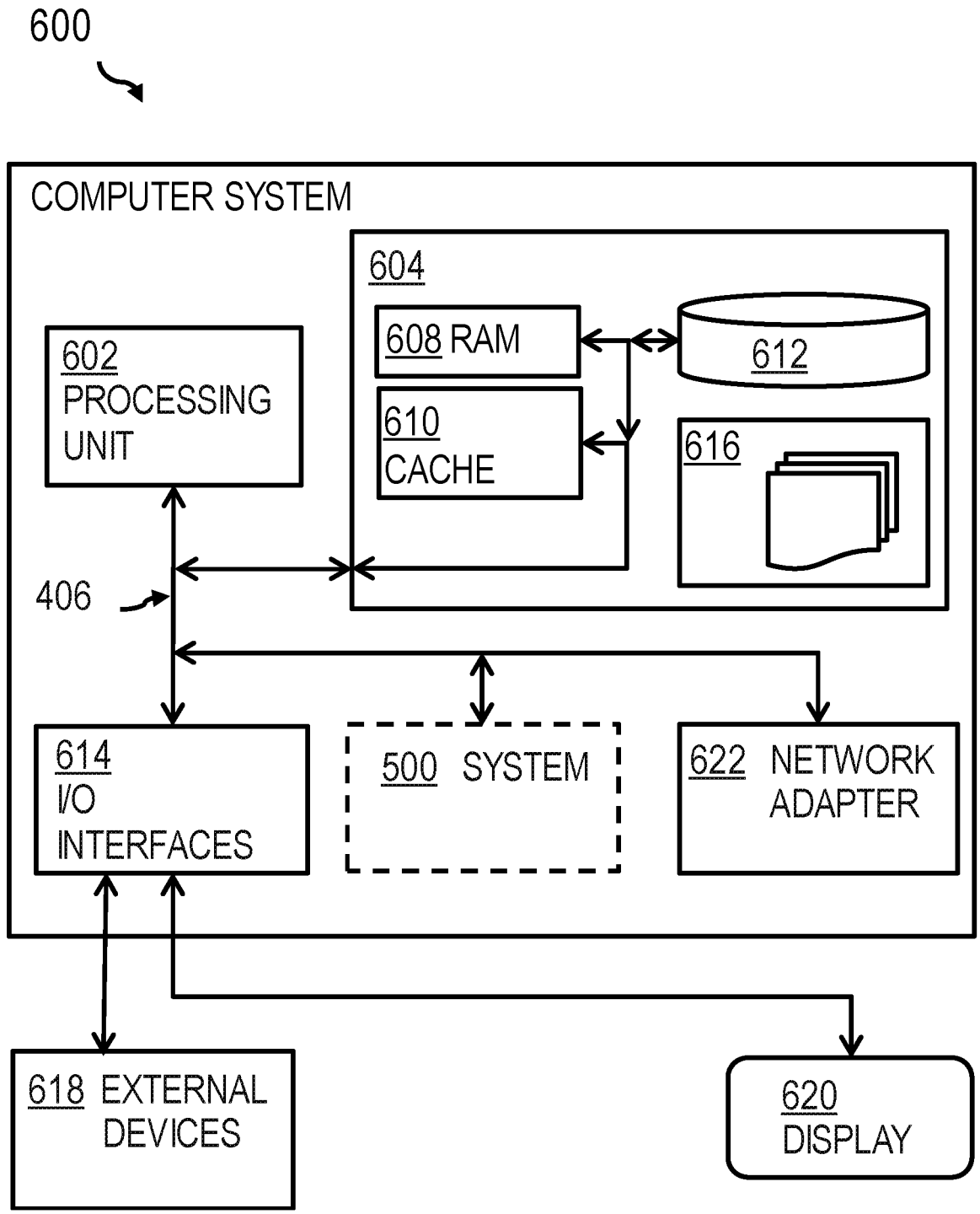
FIG. 6 shows an embodiment of a computing system comprising the cookie management system according to FIG. 5, in accordance with an embodiment of the present disclosure.

Embodiments of the present disclosure may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the present disclosure described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the present disclosure.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the present disclosure, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the cookie management system 500 for reducing cookie traffic in browser communication may be attached to the bus system 606.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

What is claimed is:

1. A computer-implemented method for reducing cookie traffic in browser communication, the method comprising:
    sending, by a browser to a first server of a domain, a first request resulting in a returned cookie, wherein the returned cookie includes a category tag;
    adding the returned cookie to a set of cookies for the browser and the category tag of the returned cookie to a related category tag in a browser tag list;
    sending, by the browser to a second server of the domain, a second request resulting in a returned list of required category tags, the second server being distinct from the first server; and
    sending, by the browser to the second server of the domain, a selected cookie with a category tag relating to at least one required category tag of the list of required category tags for the second server, the selected cookie being selected from the set of cookies and the category tag of the selected cookie occurring within the browser tag list.

2. The method according to claim 1, further comprising:
    sending, by the browser, a third request comprising a set of cookies required according to the browser tag list.

3. The method according to claim 2, wherein the first request, the second request, or the third request is a hypertext transfer protocol request.

4. The method according to claim 1, wherein the selected cookie is a list of required cookies.

5. The method according to claim 4, further comprising:
    building a server-to-cookie mapping by the browser.

6. The method according to claim 1, wherein a tag comprises a wildcard as a component of a category tag.

7. The method according to claim 1, wherein the browser tag list is stored persistently.

8. The method according to claim 1, wherein the browser is a component of an application.

9. The method according to claim 1, wherein the category tag is a component of hypertext transfer protocol header data.

10. The method according to claim 1, wherein the result of the second request is also a list of cookies not to be sent.

11. A cookie management system for reducing cookie traffic in browser communication, the system comprising:
    one or more processors; and
    a computer-readable storage medium, coupled to the one or more processors, storing program instructions that, when executed by the one or more processors, cause the one or more processors to perform operations comprising:

sending, by a browser to a first server of a domain, a first request resulting in a returned cookie, wherein the returned cookie includes a category tag;

adding the returned cookie to a set of cookies for the browser and the category tag of the returned cookie to a related category tag in a browser tag list;

sending, by the browser to a second server of the domain, a second request resulting in a returned list of required category tags, the second server being distinct from the first server; and sending, by the browser to the second server of the domain, a selected cookie with a category tag relating to at least one required category tag of the list of required category tags for the second server, the selected cookie being selected from the set of cookies and the category tag of the selected cookie occurring within the browser tag list.

12. The system according to claim 11, further comprising:
sending, by the browser, a third request comprising a set of cookies required according to the browser tag list.

13. The system according to claim 12, wherein the first request, the second request, or the third request is a hypertext transfer protocol request.

14. The system according to claim 11, wherein the selected cookie is a list of required cookies.

15. The system according to claim 13, wherein the operations further comprise:
building a server-to-cookie mapping by the browser.

16. The system according to claim 11, wherein a tag comprises a wildcard as a component of a category tag.

17. The system according to claim 11, wherein the browser tag list is stored persistently.

18. The system according to claim 11, wherein the browser is a component of an application.

19. The system according to claim 11, wherein the result of the second request is also a list of cookies not to be sent.

20. A computer program product for reducing cookie traffic in browser communication, the computer program product comprising a computer readable storage medium having program instructions embodied therewith, the program instructions being executable by one or more processors to cause the one or more processors to perform operations comprising:

sending, by a browser to a first server of a domain, a first request resulting in a returned cookie, wherein the returned cookie includes a category tag;

adding the returned cookie to a set of cookies for the browser and the category tag of the returned cookie to a related category tag in a browser tag list;

sending, by the browser to a second server of the domain, a second request resulting in a returned list of required category tags, the second server being distinct from the first server; and sending, by the browser to the second server of the domain, a selected cookie with a category tag relating to at least one required category tag of the list of required category tags for the second server, the selected cookie being selected from the set of cookies and the category tag of the selected cookie occurring within the browser tag list.

* * * * *